United States Patent [19]
Croix-Marie et al.

[11] 3,954,153
[45] May 4, 1976

[54] SYSTEM OF SUSPENSION AND/OR GUIDANCE FOR GROUND EFFECT MACHINE

[75] Inventors: Francis Jean-Marie Croix-Marie, Morsang-sur-Orge; Paul Aimé Lebargy, Saint-Arnoult-en-Yvelines, both of France

[73] Assignee: Bertin & Cie, Plaisir, France

[22] Filed: Mar. 11, 1974

[21] Appl. No.: 442,589

[30] Foreign Application Priority Data
Mar. 13, 1973 France ............................. 73.08816

[52] U.S. Cl. ............................ 180/124; 180/121; 180/127
[51] Int. Cl.² .......................................... B60V 1/18
[58] Field of Search ........... 180/121, 127, 128, 124, 180/116

[56] References Cited
UNITED STATES PATENTS

| | | | |
|---|---|---|---|
| 3,258,080 | 6/1966 | Williams et al. | 180/127 |
| 3,414,076 | 12/1968 | Bertin et al. | 180/124 |
| 3,628,625 | 12/1971 | Boyles, Jr. | 180/127 |
| 3,631,938 | 1/1972 | Eggington | 180/121 |
| 3,643,757 | 2/1972 | Delamare | 180/127 |
| 3,647,018 | 3/1972 | Croix-Marie | 180/124 |

Primary Examiner—M. H. Wood, Jr.
Assistant Examiner—Jack D. Rubenstein
Attorney, Agent, or Firm—A. W. Breiner

[57] ABSTRACT

The invention has to do with a system designed to support and/or guide a ground effect machine (1) along a supporting surface (2).

This system consists of structure (4) carrying a load (F), a floating partition (5) holding the cushion (9) and a flexible partition (10) defining laterally between the structure (4) and the partition (5) an enclosure of suspension (13) having a variable volume which is connected with the cushion (9) through calibrated orifices (6). The enclosure of suspension (13) has a convergent-divergent configuration, for example biconic. The area of the base (S), the area ($S_o$) at the level of the collar (15) and the angle ($\theta$) of the enclosure (13) are predetermined and remain constant.

4 Claims, 8 Drawing Figures

SYSTEM OF SUSPENSION AND/OR GUIDANCE FOR GROUND EFFECT MACHINE

This invention has to do with a ground effect machine capable of adapting to a supporting surface such as the ground or to a guiding surface through at least one cushion filled with a fluid under pressure; this invention more specifically has to do with the system used to support and/or guide the machine along the supporting surface.

This system of support and/or guidance is of the type including together; a structure approximately parallel to the supporting surface with a certain clearance from it; a partition approximately parallel to the structure and pierced with at least one orifice with calibrated opening; (The partition is floating between the structure and the supporting surface. The partition, the supporting surface and peripheral partitions form a fluid cushion.); a leak-proof flexible partition, attached at one side to the structure and attached at the other side to the floating partition, defining laterally, an enclosure of suspension with variable volume which is opened through the calibrated orifice to the cushion; a means to supply fluid under pressure to the enclosure of suspension and through the latter to the so-called cushion.

In the known systems of this type, part of the flexible partition or fabric which enclose laterally, the variable volume enclosure of suspension, usually comes to rest on the structure with a surface of contact whose area varies in relation to the volume (or degree of compression) of this enclosure. The volume depends on the load of the machine, the operation of the cushion and the pressure drop through the calibrated orifice.

Under these conditions, the flexible partition or fabric, which generally has a configuration bulging from the structure, makes creases often difficult to pleat, which rub against the surface of contact.

This can result in pre-mature wear of this flexible partition at the creases.

This invention proposes to eliminate this variable surface of contact and the inconvenience due to friction of the creases of the flexible partition on such a surface.

For this purpose, according to the invention, in a system of support and/or guidance of the type described, the suspension enclosure has (seen from a section perpendicular to the structure) a convergent-divergent configuration, whose collar of constant section is located between the structure and the floating partition.

Under one type of application, the suspension enclosure has almost the shape of two truncated cones opposite each other and having a small common base.

Under another type of application, the suspension enclosure has almost the shape of two truncated pyramids opposite each other and having a small common base.

Under another type of application, the suspension enclosure has almost the shape of two truncated prisms having a common side.

Under yet another type of application, the flexible partition, which encloses the suspension enclosure, is equipped at the level of the collar with reinforcement such as a flexible band, a rigid ring or a rigid frame.

The description which follows, along with the attached drawings, given as non-limiting examples, will make understandable how the invention can be put into practice.

Figure 1:
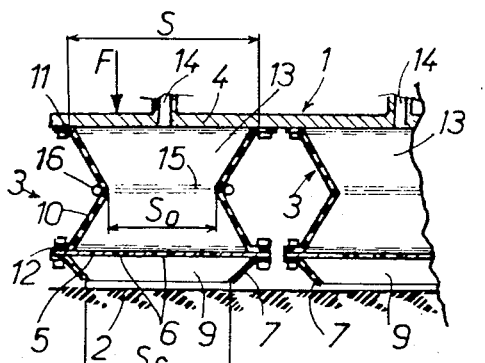
FIG. 1 shows the section of a ground effect machine equipped with a system of sustention and/or guidance, including a pneumatic enclosure of suspension enclosed by a flexible partition, which conforms with the invention. The enclosure is shown in maximum volume configuration.

In the FIGS. 1 to 4, 1 represents a ground effect machine capable of adapting to a supporting surface 2 such as the ground or a surface of guidance through one or several systems 3 of support and/or of guidance using cushions filled with fluid under pressure.

Each system of support and/or of guidance includes a structure 4 approximately parallel to the supporting surface 2 with a certain clearance from it. The structure 4 (which can be part of the chassis of the machine) is made, as in the example shown, of a load platform. Between this structure and the supporting surface 2, a floating partition 5 is installed approximately parallel to the structure and which has one or several orifices 6. The section of these orifices is calibrated so when a given flow of fluid goes through them, the loss of pressure is a function of the flow.

The floating partition 5 along with the supporting surface 2 and a simple side partition 7 (see FIGS. 1, 2, 3) or an inflatable partition 8 (see FIG. 4) makes an enclosure 9 which is a fluid cushion under pressure.

A leak-proof flexible partition 10 is attached at one of the sides 11 to the structure 4 and at the other side 12 to the floating partition 5. This flexible partition, in conjunction with the structure and the other partition makes an enclosure 13 of pneumatic suspension, connected through the calibrated orifice or orifices 6 with the enclosure 9 (cushion) and through the conduit 14 with a generator of fluid under pressure (such as a compressor) not represented.

As seen on a section perpendicular to the structure 4, the enclosure of suspension 13 shows a convergent-divergent configuration. The collar 15 is located between the structure and the floating partition 5. The area of the section of this collar is fixed.

Figures 5, 6:
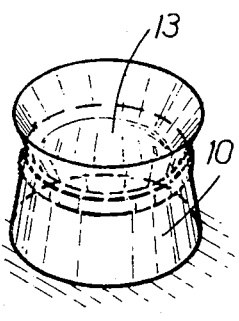
FIGS. 5 and 6 are perspective schematics of a first application of the pneumatic suspension enclosure (which conforms with the invention) showing the enclosure in maximum volume configuration and partially depressed respectively.
Figure 8:
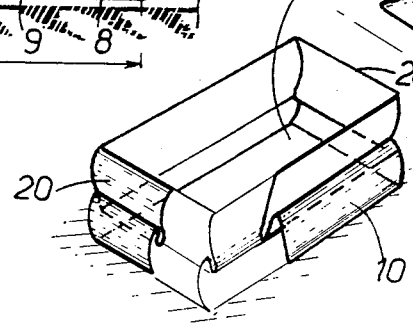
FIG. 8 is a perspective schematic of a third application of the pneumatic suspension enclosure (which conforms with the invention) showing the enclosure partially depressed.

As shown on FIGS. 5 and 6, the enclosure of suspension can show a biconic configuration, that is the shape of two truncated cones opposite each other and having a small common base. A variation could be two truncated pyramids opposite each other and having a small common base (see FIG. 8) and having the opposite sides curved and substantially expandable 20.

Figure 7:
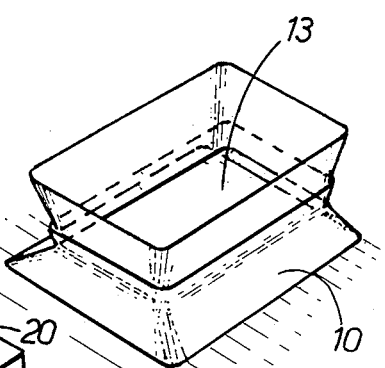
FIG. 7 is a perspective schematic of a second application of the pneumatic suspension enclosure (which conforms with the invention) showing the enclosure partially depressed.

According to part of the invention, the flexible partition 10 can be equipped at the level of the collar 15, with a reinforcing part 16 (see FIG. 1). This reinforcing part can be, in the case of a biconic suspension enclosure (FIGS. 5 and 6) a flexible band or a rigid ring; and in the case of a bipyramid (FIG. 7) or biprism (FIG. 8) it can be a rigid frame able to withstand the pressure force applied at the corners of the enclosure.

The system of support and/or guidance, in accordance with the invention, operates as follows:

The confinement enclosure 9 or fluid cushion is supplied in fluid under pressure through the conduit 14, the enclosure of suspension 13 and the orifice or orifices 6. Depending on the load to which it is submitted, the enclosure 13 compresses, more or less from a non-compressed configuration, to a maximum volume as shown on FIG. 1.

Figure 2:
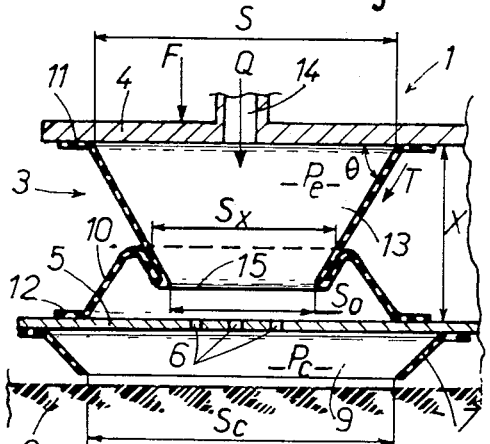
FIG. 2 shows a larger scale section of the enclosure shown on FIG. 1, showing the enclosure being depressed and showing a first type of folding of the flexible partition.
Figure 3:
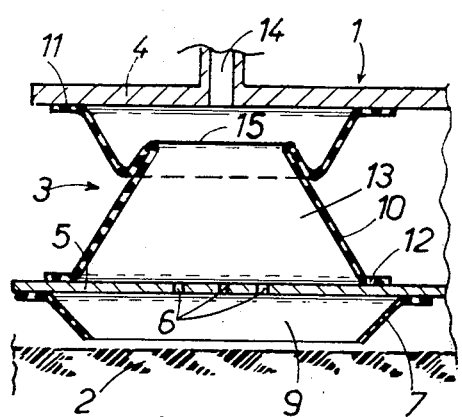
FIG. 3 shows a section similar to FIG. 2 showing a second type of folding of the flexible partition.
Figure 4:
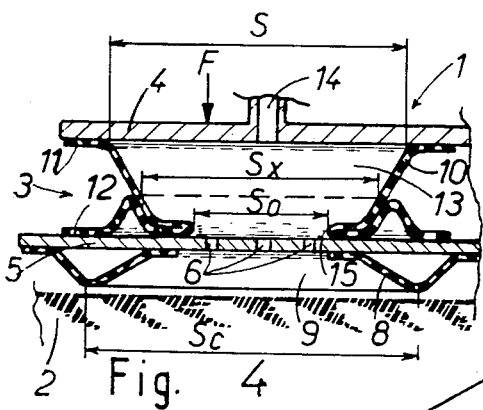
FIG. 4 shows a section similar to FIG. 2 showing the enclosure being further depressed.

During the process of compression of enclosure 13, the flexible types of retraction, shown respectively on FIGS. 2 and 3, the degree of retraction being a function of the applied force as shown below.

The following symbols have been used (see especially FIG. 2):

A — the flow (variable) of fluid under pressure to cushion 9;
$P_c$ — The (variable) pressure in cushion 9;
$P_e$ — The (variable) pressure in suspension enclosure 13;
$S_c$ — The effective area (constant) of the cushion;
S — The base area (constant) of the suspension enclosure 13 at the level of the structure 4;
$S_o$ — The area (constant) of the collar of the suspension enclosure;
$S_x$ — The area (variable) defined by the folding up of the flexible partition 10;
θ — The acute angle (constant) formed by the structure 4 and the flexible partition 10;
T — The pressure (variable) of the flexible partition 10 at proximity of the structure 4;
F — The variable load applied to the machine;
X — The height (variable) of the suspension enclosure 13;
H — The maximum value of the height X when the enclosure 13 is fully expanded;
V — The total volume (variable) of the suspension enclosure 13;

It follows that:

$$S \cdot P_e = F + T \sin \theta$$

$$F = S_c \cdot P_c$$

$$T \sin \theta = (S - S_x) \cdot P_e$$

$$P_c - P_e = kQ^2$$

k being a constant which depends on the size of the calibrated orifice or orifices 6.

From the preceding:

$$S_x = S_c \cdot \frac{P_c}{P_c + kQ^2}$$

Yet, assuming the customary flow-pressure characteristic of a generator of fluid under pressure, Q is a decreasing function of $P_c$. Therefore, the area $S_x$ defined by the folding up of the flexible partition 10 is directly proportional to the pressure $P_c$ and therefore to the load F.

Besides, the height X of the enclosure 13 is indirectly proportional to the area $S_x$. Therefore height X and volume V of the suspension enclosure (13) are indirectly proportional to the pressure $P_c$ and therefore to the load F. For each load F, or for each pressure $P_c$, corresponds for the suspension enclosure 13 an equilibrium value, and a single value for the height X, the volume V and the area $S_x$.

In addition, the derivative $dV/dP_c$ (or $dV/dF$) is negative which means, as one knows, that the suspension has a stabilizing effect.

When the suspension enclosure is fully expanded $S_x = S_o$ and $X = H$. The corresponding load of the machine is then expressed by:

$$F_1 = S_o \cdot (P_c + kQ^2)$$

When the suspension enclosure is completely depressed we have $S_x \neq S$. The corresponding load on the machine is then $$F_2 + S(P_c' + kQ'^2) \text{ with } F_2 > F_1$$

The average stiffness (ratio of the variation of load F over variation of height X) of the pneumatic suspension so defined can be determined by a choice of approximate value for S, $S_o$, k and H.

During the operation of this pneumatic suspension, the pressure T of the flexible partition or fabric 10 at proximity of the structure 4 varies in relation to the load of the machine. On the other hand — and this is essential — the angle θ formed by the flexible partition and the structure 4, as well as the area S of the base surface of the sustention enclosure 13, at proximity of the structure, remain always constant.

Considering that the folding of the flexible partition 10 works by the folding up of this partition on itself, and considering that the pressure T is exercised on the partition, because of this invention, the flexible partition 10, in the vicinity of the structure 4 does not make creases which could rub against the structure and would lead to premature wear of this flexible partition.

Finally, with the biconic configuration (see FIG. 5 and 6), the pneumatic suspension (as defined in the invention) has the advantage to act as a knee joint.

It is understood that the types of applications described above represent only examples. They could be modified specifically by substituting equivalent techniques still in keeping with the overall framework of the invention.

We claim:

1. A system for supporting and/or guiding a ground effect machine along a supporting surface, which includes: a solid structure incorporating the platform of said machine; a suspension enclosure situated under said solid structure; and a fluid cushion situated under said suspension enclosure and over said supporting surface, whereby said solid structure is approximately parallel to and spaced from said surface; said suspension enclosure being defined by said solid structure, a leak-proof partition and an apertured partition, said leak-proof partition attached at its top periphery to said solid structure and its bottom periphery to said apertured partition and being flexible and capable of folding up on itself, said apertured partition having at least one orifice of calibrated size, said leak-proof partition having a convergent-divergent configuration of two opposed truncated cones with their common smaller base located between said structure and said apertured partition, and including a reinforcement collar located between said solid structure and apertured partition and at said common smaller base of said truncated cones, said configuration being shaped and dimensioned in such manner that said apertured partition floats approximately parallel to said structure; said fluid cushion being bound by said apertured partition, side partitions attached at their tops to said apertured partition and separate and distinct from said leak-proof partition and by said supporting surface, and means for supplying with fluid under pressure the suspension enclosure and also said cushion, the latter being supplied through said enclosure and said at least one orifice of said apertured partition.

2. A system as claimed in claim 1, wherein said reinforcement collar encircles the common base of the truncated cones.

3. A system as claimed in claim 1, wherein said reinforcement collar is made of a flexible band, encircling the common base of the truncated cones.

4. A system as claimed in claim 2, wherein said reinforcement collar is a ring of rigid material.

* * * * *